US011252012B2

(12) United States Patent
Rauschenbach et al.

(10) Patent No.: US 11,252,012 B2
(45) Date of Patent: Feb. 15, 2022

(54) METHOD FOR FAULT ESCALATION IN NFV ENVIRONMENT (71) Applicant: NOKIA SOLUTIONS AND NETWORKS OY, Espoo (FI)

(72) Inventors: Uwe Rauschenbach, Poing (DE); Anatoly Andrianov, Schaumburg, IL (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 16/489,775

(22) PCT Filed: Mar. 12, 2018

(86) PCT No.: PCT/US2018/021968
§ 371 (c)(1),
(2) Date: Aug. 29, 2019

(87) PCT Pub. No.: WO2018/165652
PCT Pub. Date: Sep. 13, 2018

(65) Prior Publication Data
US 2020/0014584 A1 Jan. 9, 2020

Related U.S. Application Data (60) Provisional application No. 62/470,191, filed on Mar. 10, 2017.

(51) Int. Cl.
H04L 12/24 (2006.01)

(52) U.S. Cl.
CPC ........ *H04L 41/0609* (2013.01); *H04L 41/064* (2013.01); *H04L 41/069* (2013.01); *H04L 41/0893* (2013.01)

(58) Field of Classification Search
CPC . H04L 41/0609; H04L 41/064; H04L 41/069; H04L 41/0893
See application file for complete search history.

(56) References Cited

U.S. PATENT DOCUMENTS 6,718,141 B1 * 4/2004 deVette .............. H04B 10/0771
370/218
2011/0122768 A1 * 5/2011 George .................. H04L 45/22
370/228

(Continued)

FOREIGN PATENT DOCUMENTS

EP          3 255 833 A1   12/2017
WO   WO 2016/093861 A1    6/2016

OTHER PUBLICATIONS

International Search Report and Written Opinion dated Jun. 4, 2018 corresponding to International Patent Application No. PCT/US2018/021968.

(Continued)

Primary Examiner — Kim T Nguyen
(74) Attorney, Agent, or Firm — Squire Patton Boggs (US) LLP (57) ABSTRACT The Fault Management (FM) in the Network Function Virtualization (NFV) environment may benefit from various methods. For example methods for fault escalation or de-escalation may be beneficial. A method can include requesting a change in a severity of a virtualized resource alarm. The method can also include deciding to change a severity of a virtualized resource alarm. The requesting the change in the severity can be based on the identified reason.

17 Claims, 8 Drawing Sheets (56) References Cited

U.S. PATENT DOCUMENTS

2017/0063599 A1     3/2017  Wu et al.
2017/0339007 A1*   11/2017  Wang .................. H04L 41/0695
2017/0346676 A1*   11/2017  Andrianov ............ H04L 41/069
2019/0199582 A1*    6/2019  Liu ..................... H04L 41/0631

OTHER PUBLICATIONS

Huawei Tech (UK) Co et al.: "Editorials following 1159_on top of_IFA008v000904," ETSI Draft; GS NFV IFA008 V0.9.4 (Aug. 2016), Group Specification, vol. WG-NFV IFA—Interfaces and Architecture, Aug. 23, 2016, pp. 1-82, XP014277729.

"Network Functions Virtualisation (NFV) Release 2; Protocols and Data Models; Restful Protocols specification for the Ve-Vnfm Reference Point," ETSI Draft; ETSI GS NFV-SOL 002 V2.3.1 (Aug. 2017), Group Specification, Sep. 1, 2017, pp. 1-216, XP014311723.

3GPP TR 32.842 V13.1.0 (Dec. 2015), Technical Report, 3rd Generation Partnership Project; Technical Specification Group Services and System Aspects; Telecommunication management; Study on network management of virtualized networks (Release 13), 3GPP Standard, Dec. 18, 2015, pp. 1-84, XP051294647.

Communication pursuant to Article 94(3) EPC dated Nov. 19, 2020 corresponding to European Application No. 18716026.2.

European Office Action issued in corresponding European Patent Application No. 18 716 026.2-216 dated Aug. 24, 2021.

* cited by examiner

METHOD FOR FAULT ESCALATION IN NFV ENVIRONMENT

CROSS-REFERENCE TO RELATED APPLICATION

This application is related to and claims the benefit and priority of U.S. Provisional Application No. 62/470,191, filed Mar. 10, 2017, the entirety of which is hereby incorporated herein by reference.

BACKGROUND

Field

The Fault Management (FM) in the Network Function Virtualization (NFV) environment may benefit from various methods. For example methods for fault escalation or de-escalation may be beneficial.

Description of the Related Art

Figure 1:
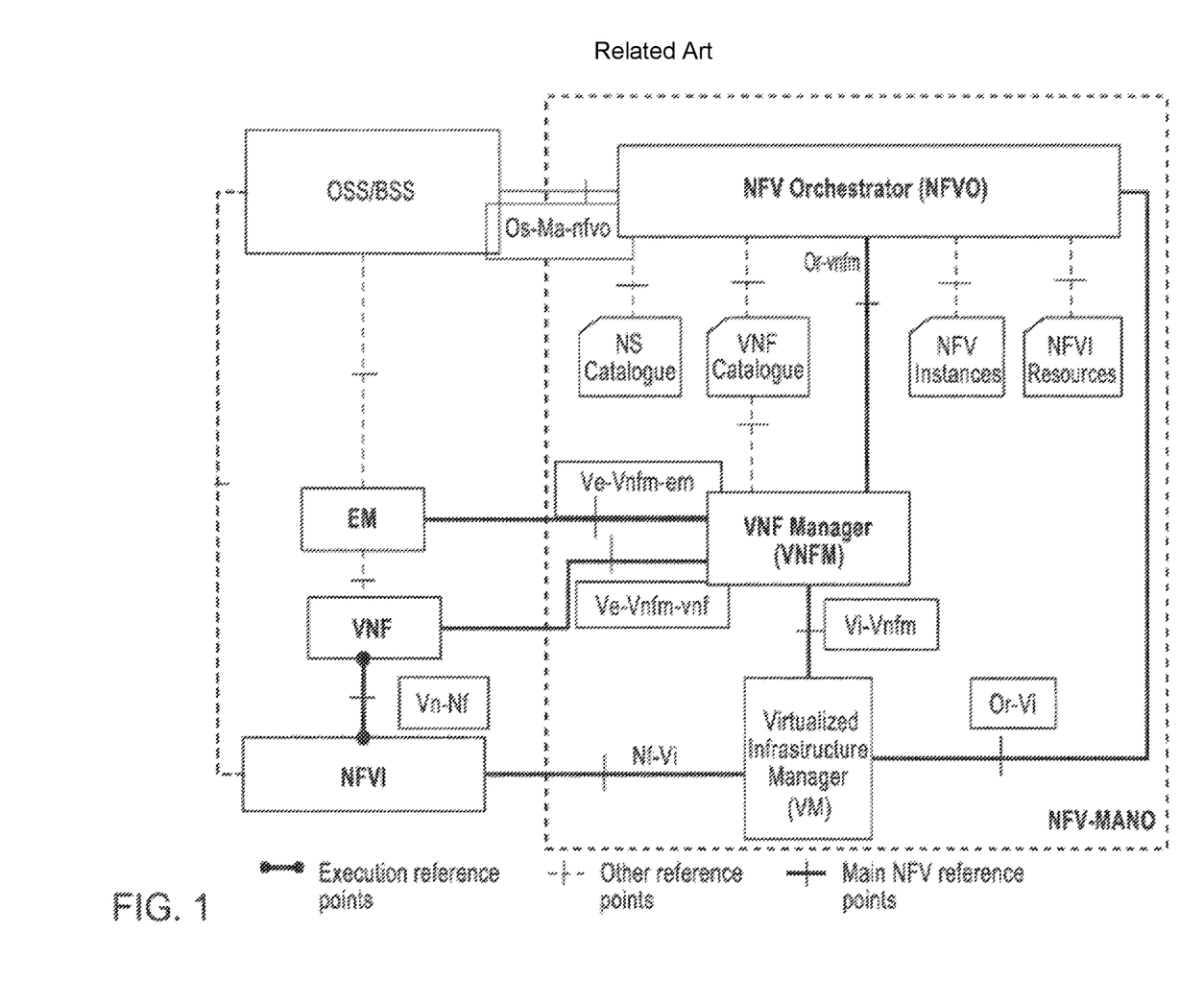
FIG. 1 illustrates a network function virtualization (NFV) management and orchestration (MANO) architectural framework with reference points.

FIG. 1 illustrates a network function virtualization (NFV) management and orchestration (MANO) architectural framework with reference points, according to ETSI NFV GS MAN001 section 5.3.

Figure 2:
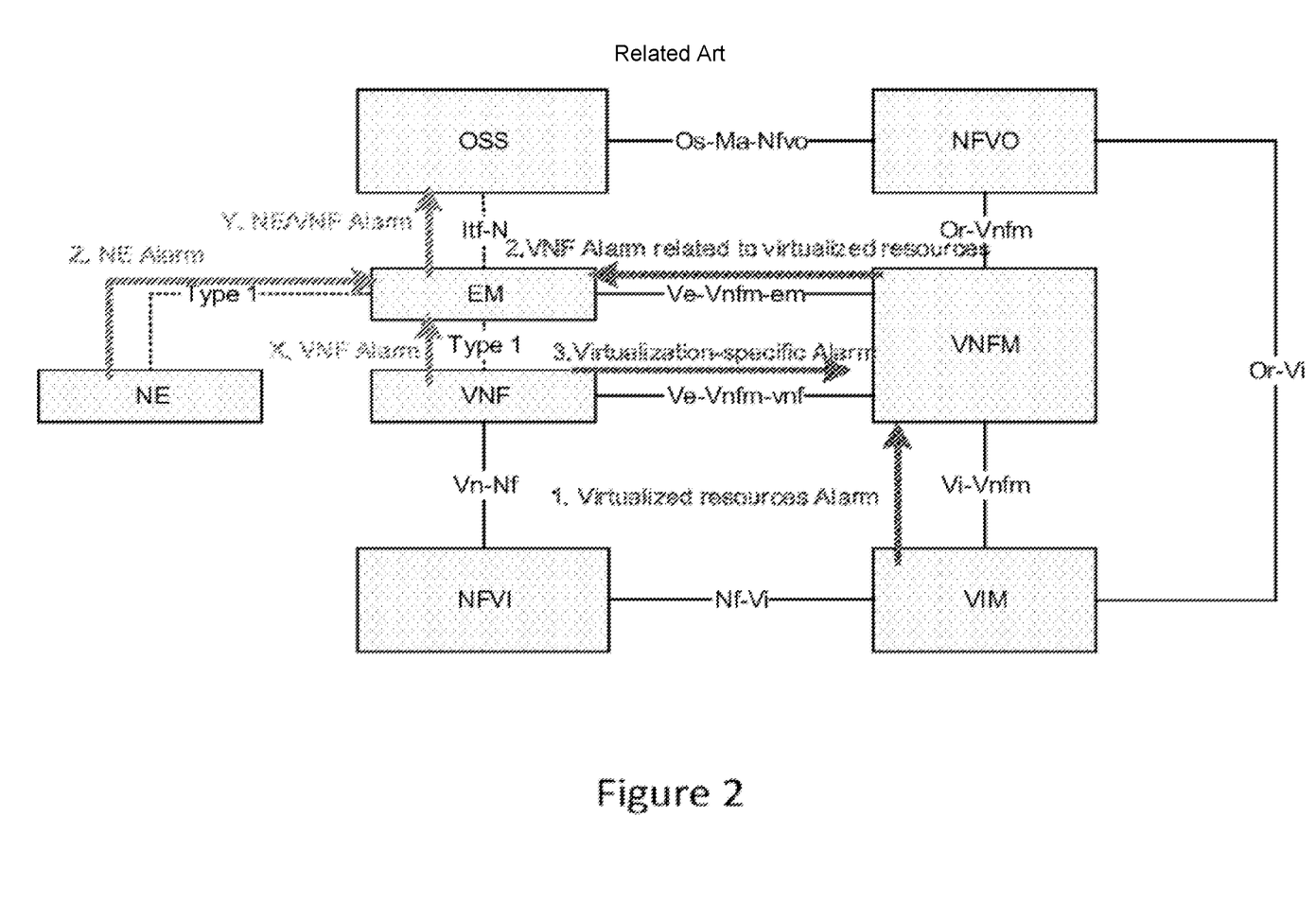
FIG. 2 illustrates a 3GPP view of alarm data flows for network element (NE)/virtualized network function (VNF).

For management of mobile network that includes virtualized network functions, 3GPP defines a set of normative specifications (3GPP TS 28.5xx). The entities on the left side of the NFV MANO architectural framework in FIG. 1 are further aligned with 3GPP Management Architecture defined in TS 32.101. In the area of fault management (FM), the data flows recognized by 3GPP are documented in TS 28.516 as depicted in FIG. 2. Specifically, FIG. 2 illustrates a 3GPP view of alarm data flows for network element (NE)/virtualized network function (VNF), according to 3GPP TS 28.516 clause 4.1.

ETSI NFV specifications define the following methods. VNF and NS Healing operations are defined as part of corresponding Lifecycle Management interfaces in IFA013 (Os-Ma-Nfvo) and IFA008 (Ve-Vnfm-Em). Also, a VNF indicator interface is defined in IFA008. The purpose of this interface is to notify MANO functional blocks (e.g. EM notifies virtualized network function manager (VNFM) or VNF notifies VNFM) about certain important events/conditions in the application space that may be necessary to know for MANO FB as an input for automated procedures such as auto-scaling and auto-healing.

Conventionally, EM is considered to be a passive consumer of VR alarms reported by VNFM in Flow-2. Because 3GPP Management System is not responsible for VR management, it conventionally cannot consume "acknowledge" and "clear" operations on the FM interface of IFA008. Moreover, conventionally the management of applications running on top of VNFs and NSs is completely out of the scope of ETSI NFV MANO. Therefore, there conventionally is no Flow-2 in reverse direction, from EM to VNFM.

In other words, there is no flow of application (3GPP NF specific) fault management (FM) data back to the MANO system. Flow-2 is uni-directional and Flow-Y carries correlated application/virtualization alarm data only to the NM. Flow-3 is application agnostic (explicitly excludes any application aspects) and is focused only on the "virtualization portion" of VNF managed not by EM, but VNFM, if such portion exists.

The management of virtualization specific FM data (i.e. alarms derived from faults in the VR depicted as Flow-1 in FIG. 2) is conventionally the responsibility of MANO. In other words, it is the responsibility of virtualized infrastructure manager (VIM), VNFM, and network functional virtualization orchestrator (NFVO) to act upon the alarms on VR.

The format of alarm data reported by MANO system (VNFM) to the EM in Flow-2 is defined in ETSI NFV GS IFA008. The 3GPP TS 28.517 defines the mapping of these alarms into 3GPP alarms reported over Itf-N in Flow-Y. A mapping rule for notifyNewAlarm can be found at 3GPP TS 28.517 clause 5.5.1.

SUMMARY

According to a first embodiment, a method can include requesting a change in a severity of a virtualized resource alarm.

In a variant, the method can also include deciding to change a severity of a virtualized resource alarm. The requesting the change in the severity can be based on the identified reason.

In a variant, the change can include a reduction in the severity.

In a variant, the reduction can be configured to be evaluated against a policy.

In a variant, the change can be an increase in the severity.

In a variant, the increase can be requested by use of an explicit attribute of a virtualized resource alarm message.

In a variant, the requesting can include sending a message from an element manager to a virtualized network function manager.

In a variant, the deciding to change the severity can be performed by an element manager.

In a variant, the deciding to change the severity can include performing an alarm correlation.

According to a second embodiment, a method can include receiving a request to change a severity of a virtualized resource alarm. The method can also include determining whether the request is for an increase or decrease in the severity. The method can further include updating the severity or applying a policy or both updating the severity and applying the policy based on the determination of whether the request is for the increase or decrease in the severity.

In a variant, the request can be received by a virtualized network function manager.

In a variant, the method can further include notifying a network function virtualization orchestrator regarding the change in the severity of the alarm.

In a variant, the applying the policy can include leaving a current severity level unchanged.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Certain embodiments address issues related to the unidirectional nature of the alarm data in Flow-2. For example, VR alarms on VNF and VNFC as managedObjects can carry perceivedSeverity attribute expressing the severity of the fault as assessed by the MANO functional blocks. This severity can be an assessment of the impact scope of the fault.

Certain embodiments can deal with the fact that certain VR faults have a limited scope of impact within MANO architecture. For example, only a single instance of VNFC may be impacted, and the level of impact may not be a complete outage of such VNFC. Applications, such as 3GPP functions, can be carried by the impacted VNF and VNFC instances.

Certain embodiments can avoid the issue the correlated alarm data expressing the impact of VR faults on applications is being reported only up (by EM to NM over Itf-N as Flow-Y) and not to any of the MANO entities.

Furthermore, certain embodiments can avoid having it be the case that the actions performed by the MANO system and their prioritization (for example, how soon a particular alarm is addressed by NFVO/VNFM/VIM) may depend only on the perceivedSeverity reported within MANO system and not on the perceivedSeverity as reported within 3GPP Management System.

Additionally, certain embodiments can provide a way for the 3GPP system to influence the priorities of alarm treatment within MANO system aside from explicit requests of corrective actions, as determined by the 3GPP system, communicated via LCM interfaces of Os-Ma-nfvo (OSS/BSS to NFVO) and of Ve-Vnfm-em (EM to VNFM) reference points.

Moreover, certain embodiments provide a way escalate certain alarms by a 3GPP management system for prioritized treatment by a MANO system.

Thus, for example, certain embodiments allow for escalation of severity for virtualized resource (VR) alarms reported by a virtualized network function manager (VNFM) to an element manager (EM), for example via Flow-2. Specifically, certain embodiments provide a new operation on an FM interface produced by a VNFM on an IFA008 reference point towards the EM.

The new operation can respect the management scope of management and orchestration (MANO). In certain embodiments, only MANO functional blocks (FBs) may be allowed to treat VR alarms. Any request to reduce the severity of VR alarm may be evaluated by VNFM against a policy. However, an escalation in severity may be requested by bumping-up the perceivedSeverity attribute of a VR alarm. After such escalation, the MANO system will be informed about higher (than internally perceived) priority of VR fault via higher value of perceivedSeverity attribute.

Figure 3:
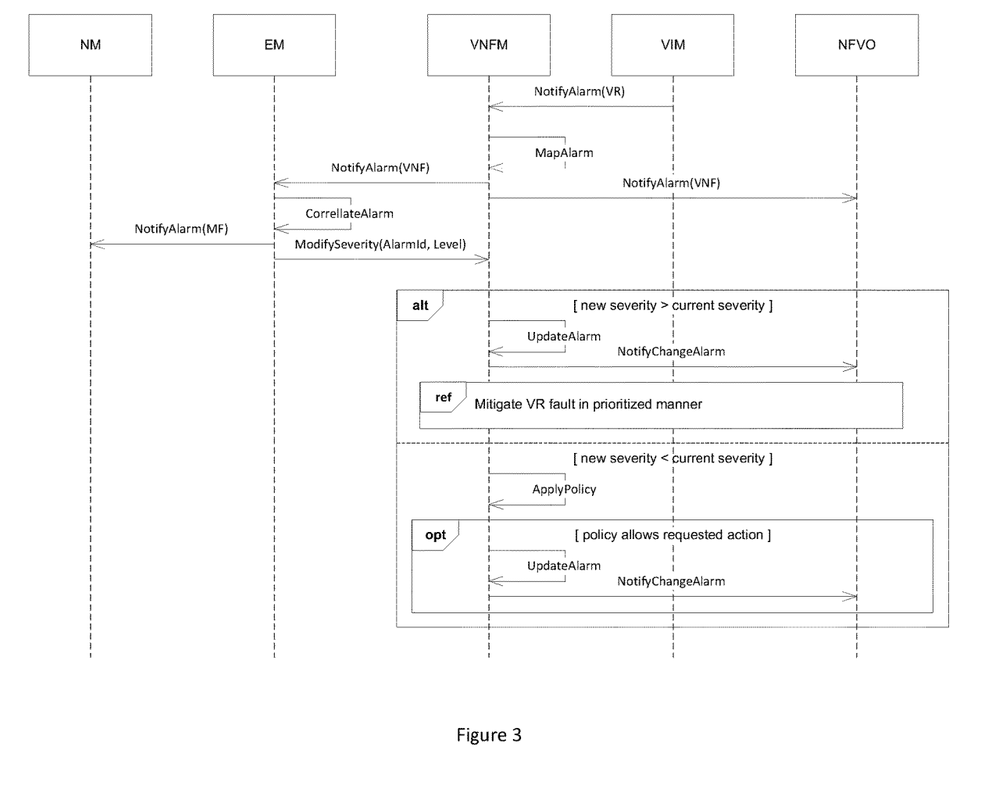
FIG. 3 illustrates a method for virtual resource (VR) alarm escalation, according to certain embodiments.

FIG. 3 illustrates a method for virtual resource (VR) alarm escalation, according to certain embodiments. Thus, FIG. 3 is a sequence diagram that illustrates a sequence of actions in a VR alarm severity modification method according to certain embodiments.

As shown in FIG. 3, a VM can notify a VR alarm to a VNFM. The VNFM can map the alarm and notify the alarm and associated VNF to an EM. The EM can correlate the alarm and notify the network manager (NM) of the alarm and correlated management function (MF).

The EM can also send a message to modify the severity of the alarm, for example identifying the alarm and a suitable level. The message could indicate the existing level in certain embodiments.

In a first illustrated alternative, the VNFM can update the alarm to a new severity from a current severity based on the message from the EM. This may be in the case of escalation, where the new severity is higher than the current severity. This change can be notified to the NFVO. The VR fault can then be mitigated in a prioritized manner.

In a second illustrated alternative, the VNFM can first apply a policy, for example when the new severity is lower than or equal to a current severity. Based on that policy assessment, the VNFM can optionally proceed as in the first illustrated alternative.

Figure 4:
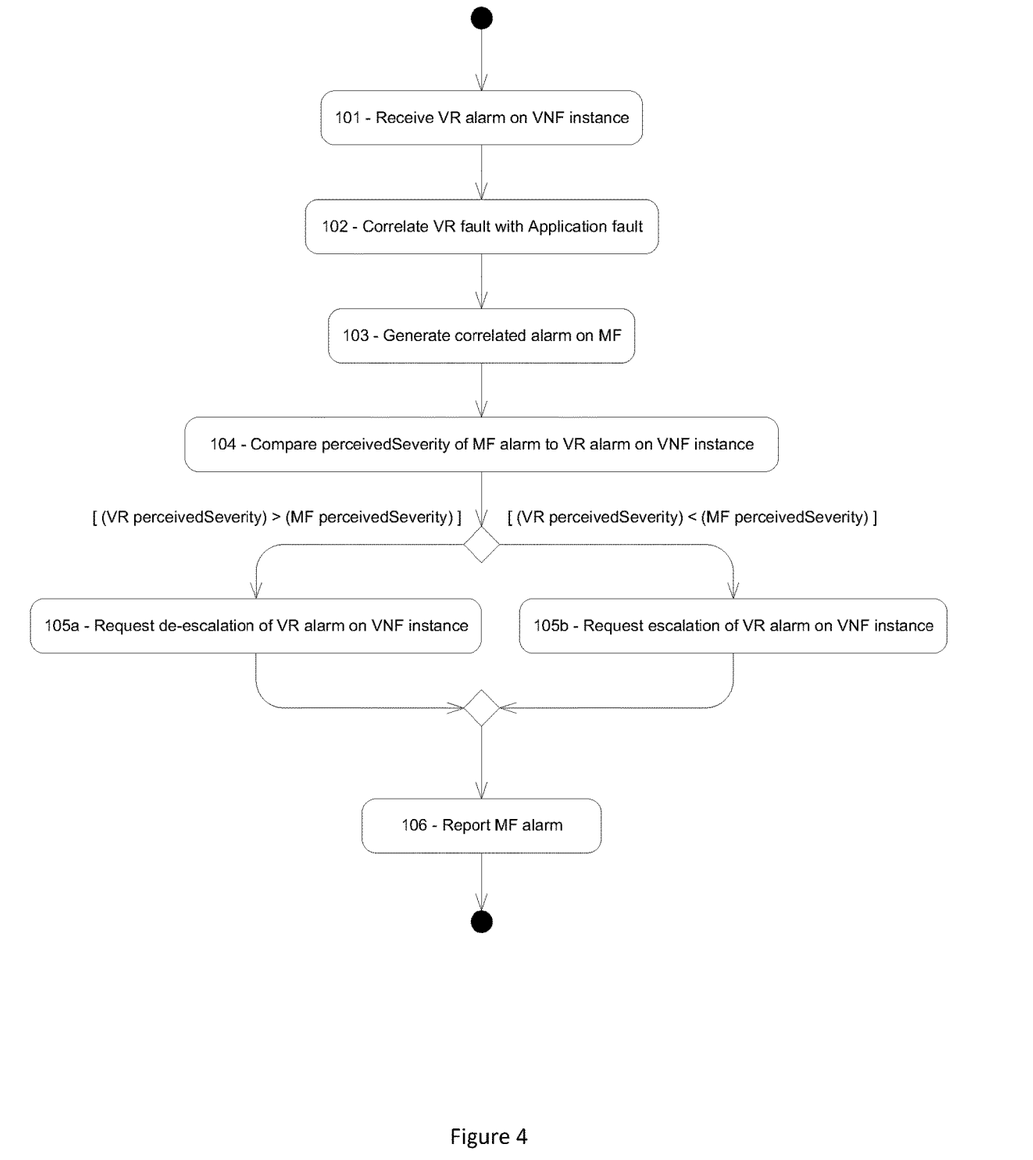
FIG. 4 illustrates a method for VR alarm severity modification, according to certain embodiments.

FIG. 4 illustrates a method for VR alarm severity modification, according to certain embodiments. More particularly, FIG. 4 identifies actions performed by an EM. For example, FIG. 4 illustrates the actions and decisions that can be performed by the EM in a method for VR alarm severity modification.

As shown in FIG. 4, at 101 an VR alarm can be received for a VNF instance. At 102, the corresponding VR fault can be correlated with an application fault. Then, at 103, a correlated alarm can be generated on a management function (MF).

At 104, the EM can compare the perceived severity of the MF alarm to the VR alarm on the VNF instance. If the comparison is that the perceived severity of the VR alarm is higher, then at 105a the EM can request a de-escalation of the VR alarm on the VNF instance. Similarly, if the comparison is that the perceived severity of the VR alarm is lower, then at 105b the EM can request an escalation of the VR alarm on the VNF instance. At 106, the EM can report the MF alarm.

Figure 5:
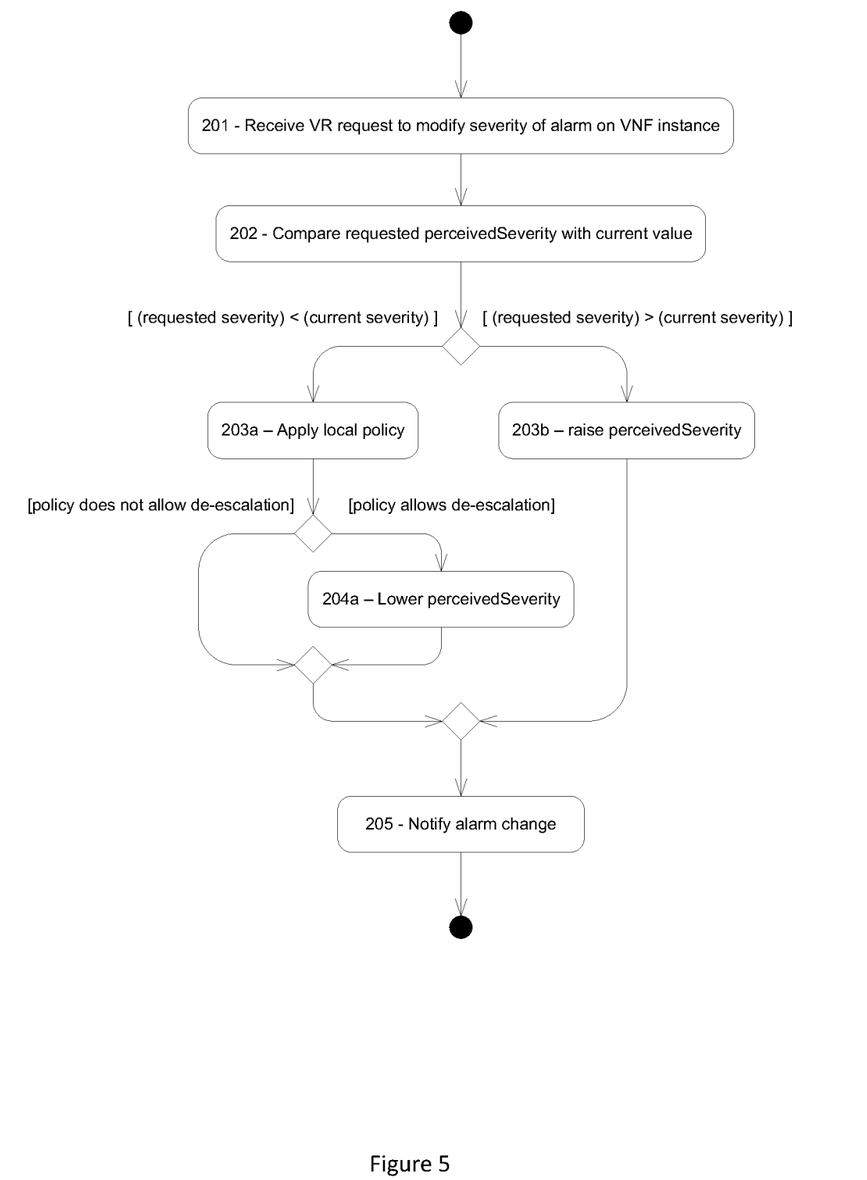
FIG. 5 illustrates a further method for VR alarm severity modification, according to certain embodiments.

FIG. 5 illustrates a further method for VR alarm severity modification, according to certain embodiments. More particularly, FIG. 5 illustrates actions performed by a VNFM.

Thus, FIG. 5 illustrates actions and decisions that can be performed by VNFM in a method for VR alarm severity modification.

As shown in FIG. 5, at 201 a VNFM can receive a VR request to modify the severity of an alarm on a VNF instance. At 202, a VNFM can compare a requested perceived severity with a current value. If the request severity is lower than a current severity, at 203a the VNFM can apply a local policy. If the policy does not allow de-escalation, then the VNFM can ignore the request and notify the alarm change at 205. If the policy allows de-escalation, then at 204a the VNFM can lower the perceived severity level and then notify the alarm change at 205.

If the requested severity level is higher than the current severity level, then at 203b, the VNFM can raise a perceived severity level. Then, at 205 the VNFM can notify the alarm change.

The above embodiments may be various implemented. For example, there can be an interface requirement such as VeVnfm-em.VnfFm.011—The VNF Fault Management interface produced by the VNFM on the Ve-Vnfm-em reference point shall support EM requesting the modification of alarm perceivedSeverity. This is just an example of a possible interface requirement. Other embodiments may not have this particular requirement.

Figure 6:
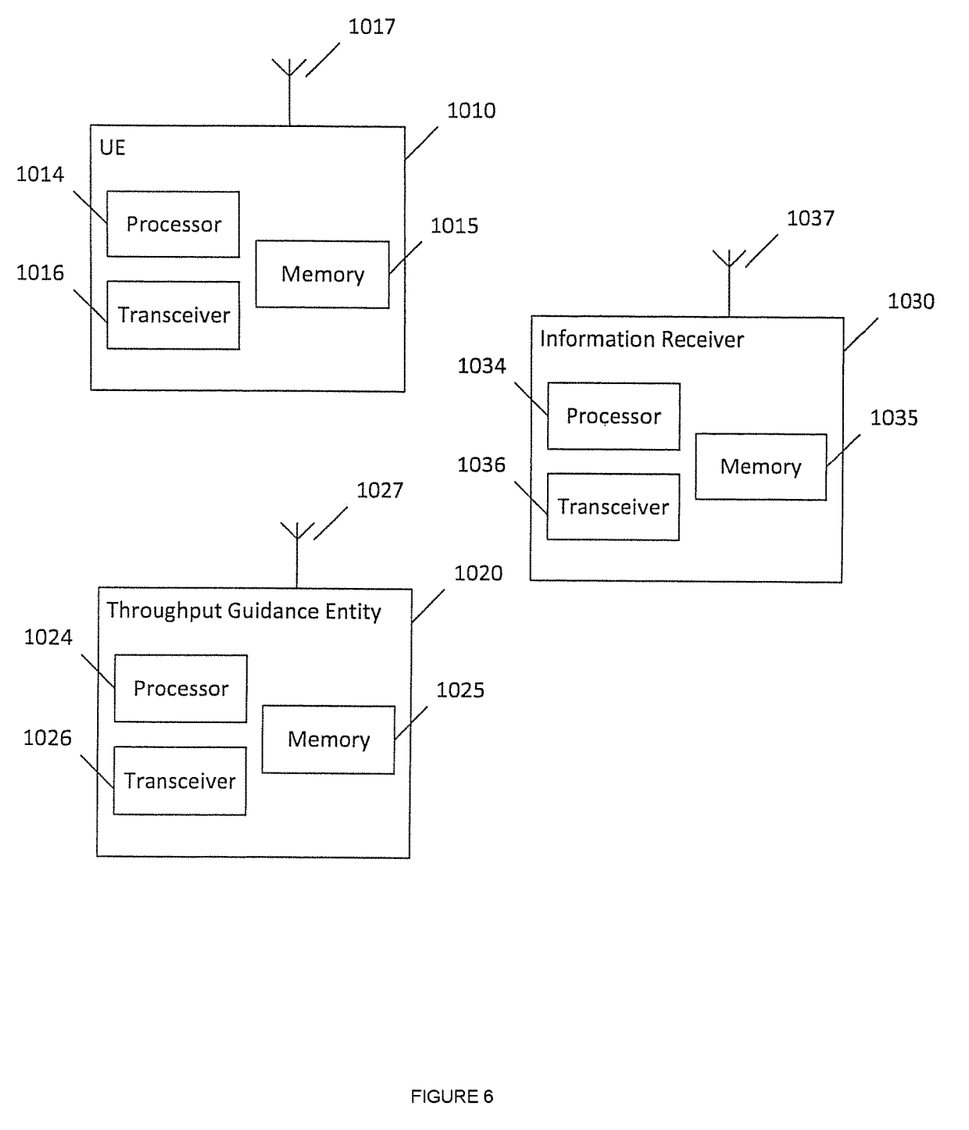
FIG. 6 illustrates a possible VNF Fault Management operation definition, according to certain embodiments.

FIG. 6 illustrates a possible VNF Fault Management operation definition, according to certain embodiments. As shown in FIG. 6, an operation for modifying alarm severity can be defined. The terms "mandatory" and the like in the figure represent one implementation, and are not limiting on all embodiments. As shown, the perceived severity can have a variety of levels from critical to cleared.

In ETSI NFV GS SOL002 the operation described above can be realized in at least two different ways:

In a first alternative, assuming an alarm is modelled as a REST resource, the alarm severity can be modelled by a PATCH operation.

Resource: {apiRoot}/fm/v1/alarm_list/{alarm_id}

An HTTP patch method can modify an individual alarm resource. The request body for this method can have a data type of AlarmModificationRequest, a cardinality of 1 and can include parameters for the modification of the alarm. The response can have a "204 No content" code or "202 Accepted" code or "200 OK" code, and can simply confirm that the request was successful.

The AlarmModificationRequest type can represent requested modifications of the state of an alarm, including the severity attribute. The perceivedSeverity attribute can have a data type of Enum (inlined) and a cardinality of 0 . . . 1. The attribute may have a new value of the perceived severity or may have a null value to remove the attribute.

According to a second alternative, assuming an AlarmList is modelled as a REST resource, the request can be represented as a task resource.

Resource: {apiRoot}/fm/v1/alarm_list/modifySeverity

An HTTP POST method can modify the perceived severity of one or more alarms in the alarm list. The request/response body can be similar to that of the HTTP PATCH method described above, but with the datatype ModifySeverityRequest.

The ModifySeverityRequest type can represent requested modifications of the perceived severity of one or more alarms. The attributes modifications, alarmID, and newPerceivedSeverity can be included. The attribute modifications can have a data type Structure (inlined) with cardinality 1 . . . N. This can provide pairs of alarm identifier and new perceivedSeverity value.

The attribute alarmID can have a data type of identifier, a cardinality of 1 and can provide an identifier of an alarm whose perceivedSeverity attribute is requested to be modified.

The attribute newPerceivedSeverity can have a data type of Enum and a cardinality of 1. This attribute can have any of the following examples of permitted values: cleared, critical, major, minor, warning, or indeterminate. Only a subset of the target perceivedSeverity values may be allowed, according to a particular current policy.

According to a third alternative, assuming an AlarmList is modelled as a REST resource, the request can be represented as a PATCH operation with a tailored entity body.

Resource: {apiRoot}/fm/v1/alarm_list

In this HTTP patch method, the perceived severity of one or more alarms in the alarm list can be modified. The details of the PATCH request/response can be as in the previous alternatives, except that the data type AlarmBulkModificationRequest can be used.

This type can represent requested modifications of the perceived severity of one or more alarms. Similar to the ModifySeverityRequest type, the AlarmBulkModificationRequest type can represent requested modifications of the perceived severity of one or more alarms. The attributes modifications, alarmID, and newPerceivedSeverity can be included. The attribute modifications can have a data type Structure (inlined) with cardinality 1 . . . N. This can provide pairs of alarm identifier and new perceivedSeverity value.

The attribute alarmID can have a data type of identifier, a cardinality of 1 and can provide an identifier of an alarm whose perceivedSeverity attribute is requested to be modified.

The attribute newPerceivedSeverity can have a data type of Enum and a cardinality of 1. This attribute can have any of the following examples of permitted values: cleared, critical, major, minor, warning, or indeterminate. Only a subset of the target perceivedSeverity values may be allowed, according to a particular current policy.

Figure 7:
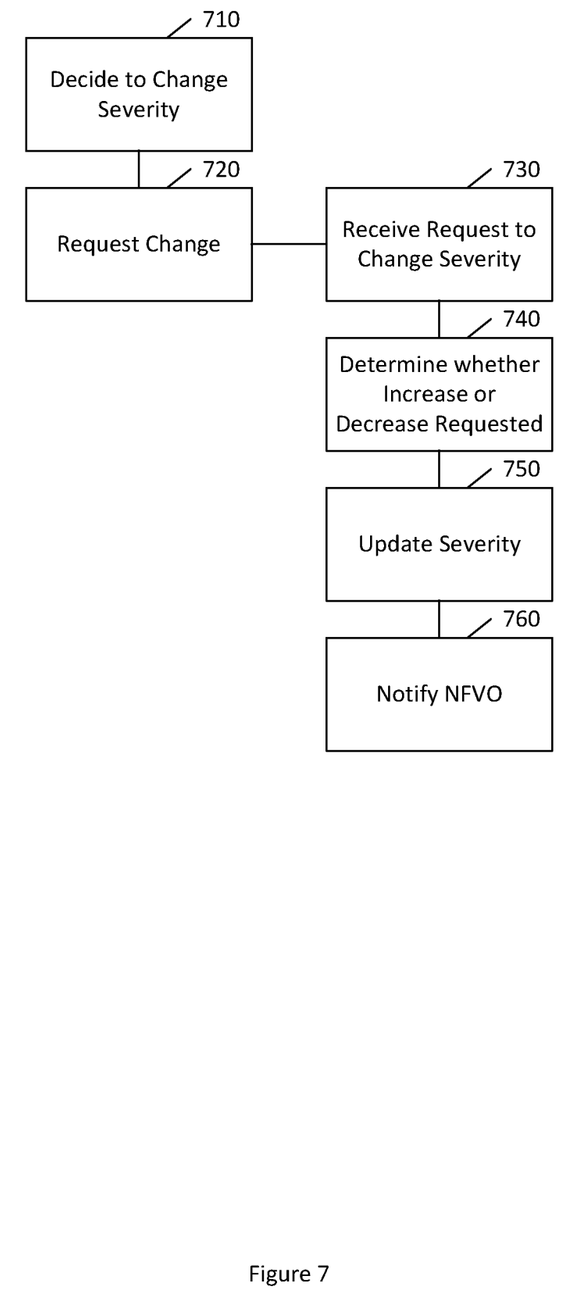
FIG. 7 illustrates a method according to certain embodiments.

FIG. 7 illustrates a method according to certain embodiments. As shown in FIG. 7, at 720, a method can include requesting a change in a severity of a virtualized resource alarm. At 710, the method can also include deciding to change a severity of a virtualized resource alarm. The requesting the change in the severity can be based on the identified reason.

The change can include a reduction in the severity. The reduction can be configured to be evaluated against a policy.

Alternatively, the change can be an increase in the severity. The increase can be requested by use of an explicit attribute of a virtualized resource alarm message.

The requesting can include sending a message from an element manager to a virtualized network function manager.

The deciding to change the severity can be performed by an element manager. The deciding to change the severity can include performing an alarm correlation.

The method can further include, at 730, receiving a request to change a severity of a virtualized resource alarm. The method can also include, at 740, determining whether the request is for an increase or decrease in the severity. The method can additionally include, at 750, updating the severity or applying a policy or both updating the severity and applying the policy based on the determination of whether the request is for the increase or decrease in the severity. The applying the policy can include leaving a current severity level unchanged.

The request can be received by a virtualized network function manager. The method can also include, at 760, notifying a network function virtualization orchestrator regarding the change in the severity of the alarm.

Figure 8:
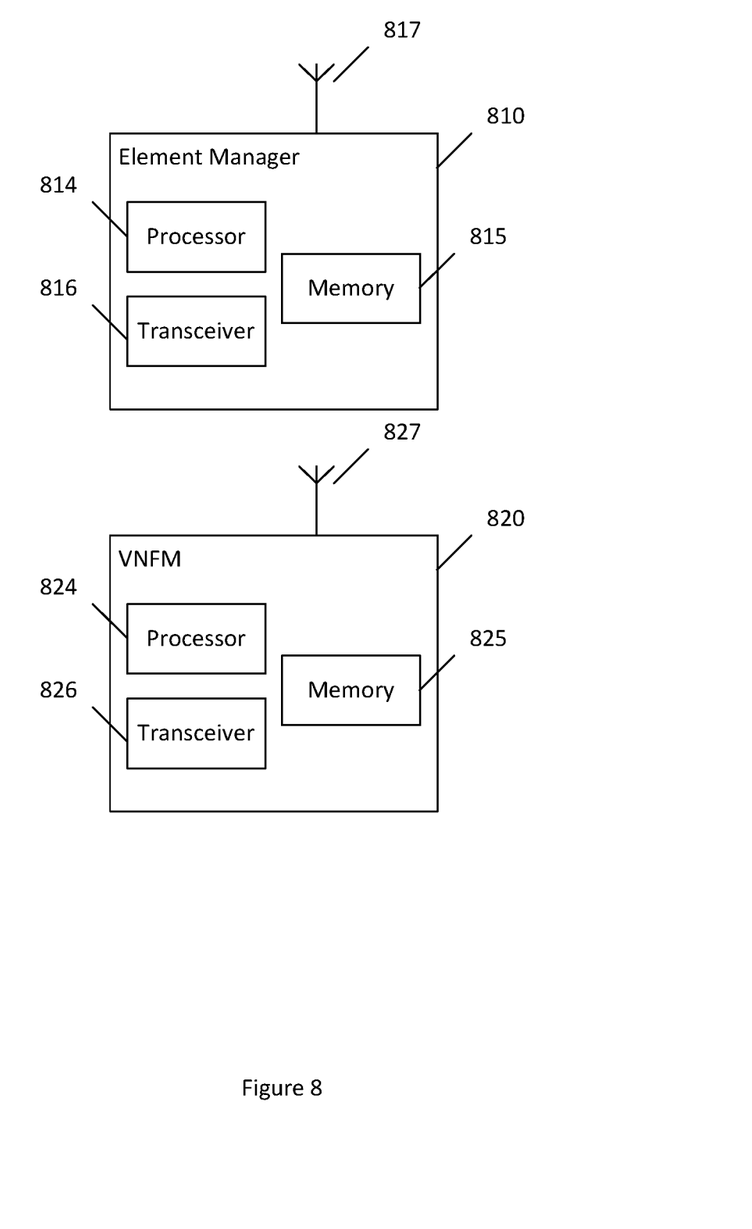
FIG. 8 illustrates a system according to certain embodiments.

FIG. 8 illustrates a system according to certain embodiments of the invention. It should be understood that each block of the flowchart of FIG. 7 may be implemented by various means or their combinations, such as hardware, software, firmware, one or more processors and/or circuitry. In one embodiment, a system may include several devices, such as, for example, element manager 810 and virtualized network function manager (VNFM) 820. The system may include more than one VNFM 820 and more than one element manager 810, although only one of each is shown for the purposes of illustration.

Each of these devices may include at least one processor or control unit or module, respectively indicated as 814 and 824. At least one memory may be provided in each device, and indicated as 815 and 825, respectively. The memory may include computer program instructions or computer code contained therein, for example for carrying out the embodiments described above. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, element manager 810 and VNFM 820 may be additionally or solely configured for wired communication, in addition to wireless communication, and in such a case antennas 817 and 827 may illustrate any form of communication hardware, without being limited to merely an antenna.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a element manager to deliver local content. One or more functionalities may also be implemented as a virtual application that is provided as software that can run on a server.

In an exemplifying embodiment, an apparatus, such as a node or other device, may include means for carrying out embodiments described above in relation to FIG. 7.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as element manager 810 and/or VNFM 820, to perform any of the processes described above (see, for example, FIG. 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 8 illustrates a system including a element manager 810 and a VNFM 820, embodiments of the invention may be applicable to other configurations, and configurations involving additional elements, as illustrated and discussed herein.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   requesting, by use of an explicit attribute of a virtualized resource alarm message, a change in a severity of a virtualized resource alarm;
   determining to change the severity of the virtualized resource alarm,
   wherein the change comprises an escalation in the severity, and
   wherein the escalation is requested by use of the explicit attribute of the virtualized resource alarm message.

2. The method of claim 1, wherein the requesting the change in the severity is based on an identified reason.

3. The method of claim 2, wherein the identified reason is identified in the request.

4. The method of claim 1, wherein the change comprises a reduction in the severity.

5. The method of claim 4, wherein the reduction is configured to be evaluated against a policy.

6. The method of claim 1, wherein the requesting comprises sending a message from an element manager to a virtualized network function manager.

7. The method of claim 1, wherein the determining to change the severity is performed by an element manager.

8. The method of claim 1, wherein the determining to change the severity comprises performing an alarm correlation.

9. An apparatus, comprising:
at least one processor; and
at least one memory including computer program code,
wherein the at least one memory and the computer program code are configured to, with the at least one processor, cause the apparatus at least to perform a process, the process comprising the method according to claim 1.

10. A non-transitory computer readable medium encoded with instructions that, when executed in hardware, perform a process, the process comprising the method according to claim 1.

11. A method, comprising:
receiving, using an explicit attribute of a virtualized resource alarm message, a request to change a severity of a virtualized resource alarm; and
updating the severity or applying a policy or both updating the severity and applying the policy based on the request,
wherein updating the severity of the virtualized resource alarm comprises an escalation in the severity, and
wherein the escalation is received in the request by use of the explicit attribute of the virtualized resource alarm message.

12. The method of claim 11, further comprising:
determining that the request is for a decrease in the severity,
wherein the updating is based on the determination that the request is for the decrease in the severity.

13. The method of claim 11, wherein the request is received by a virtualized network function manager.

14. The method of claim 11, further comprising:
notifying a network function virtualization orchestrator regarding the change in the severity of the virtualized resource alarm.

15. The method of claim 11, wherein the applying the policy comprises leaving a current severity level unchanged.

16. An apparatus, comprising:
at least one processor; and
at least one memory including computer program code,
wherein the at least one memory and the computer program code are configured to, with the at least one processor, cause the apparatus at least to perform a process, the process comprising the method according to claim 11.

17. A non-transitory computer readable medium encoded with instructions that, when executed in hardware, perform a process, the process comprising the method according to claim 11.

* * * * *